US008623169B2

(12) United States Patent
Delfino et al.

(10) Patent No.: US 8,623,169 B2
(45) Date of Patent: Jan. 7, 2014

(54) ADHESIVE SYSTEM FOR THE DIRECT BONDING OF A CURED POLYURETHANE TO CRUDE RUBBER

(75) Inventors: Antonio Delfino, Grolley (CH);
Philippe Chenaux, Corpataux (CH);
Corinne Deforel, Villars-sur-Glane (CH)

(73) Assignee: Conception et Developpement Michelin S.A., Givisiez (CH)

( * ) Notice: Subject to any disclaimer, the term of this patent is extended or adjusted under 35 U.S.C. 154(b) by 0 days.

(21) Appl. No.: 13/489,194

(22) Filed: Jun. 5, 2012

(65) Prior Publication Data

US 2013/0000841 A1 Jan. 3, 2013

Related U.S. Application Data

(62) Division of application No. 11/631,701, filed as application No. PCT/EP2005/007287 on Jul. 6, 2005, now abandoned.

(30) Foreign Application Priority Data

Jul. 7, 2004 (FR) ..................................... 04 07666

(51) Int. Cl.
*C08K 5/01* (2006.01)
*C08K 3/34* (2006.01)
*C08L 91/08* (2006.01)
*C08L 95/00* (2006.01)
*C04B 37/00* (2006.01)
*B41J 2/16* (2006.01)
*B32B 7/12* (2006.01)

(52) U.S. Cl.
USPC ........... 156/325; 156/326; 156/327; 523/518; 523/521

(58) Field of Classification Search
USPC ........................... 156/325–327; 523/518–521
See application file for complete search history.

(56) References Cited

U.S. PATENT DOCUMENTS 2,905,582 A 9/1959 Coleman, Jr. et al.
3,047,530 A 7/1962 Nischk et al.
(Continued)

FOREIGN PATENT DOCUMENTS

EP 0 318 962 6/1989
GB 1 015 340 12/1965
(Continued)

OTHER PUBLICATIONS

"Epoxy Resin vs. Vinylesters and Polyesters" http://web.archive.org/web/20030110124633/http://redrockstore.com/resin.htm.

Primary Examiner — Michael Orlando
(74) Attorney, Agent, or Firm — Cozen O'Connor

(57) ABSTRACT

Adhesive composition usable in particular as an adhesion primer, based on a polyisocyanate compound and a polyester or vinyl ester resin comprising (in particular hydroxyl) functional groups which are reactive towards isocyanate groups of said polyisocyanate, the total number of said isocyanate groups being in excess relative to the total number of said functional groups of the polyester or vinyl ester resin. The polyisocyanate compound is preferably a diisocyanate, the resin is preferably an epoxy vinyl ester resin, in particular novolac- and/or bisphenol-based. Said composition is usable, as an adhesion primer, in combination with a secondary adhesion layer preferably based on a polyvinylpyridine/stirene/butadiene elastomer and a polyester or vinyl ester resin. Use of such an adhesive system for bonding a cured polyurethane to an uncured diene elastomer composition, in particular in the manufacture of rubber articles consisting of ground contact systems for motor vehicles, in particular pneumatic or non-pneumatic tires.

18 Claims, 1 Drawing Sheet

(56) References Cited

U.S. PATENT DOCUMENTS

| | | |
|---|---|---|
| 4,690,987 A | 9/1987 | Sakakibara et al. |
| 4,804,691 A | 2/1989 | English et al. |
| 4,942,093 A | 7/1990 | Lawson |
| 5,462,617 A | 10/1995 | Bender et al. |
| 6,624,283 B2 | 9/2003 | Viegas et al. |

FOREIGN PATENT DOCUMENTS

| | | |
|---|---|---|
| GB | 1 447 674 | 8/1976 |
| WO | WO 84/00170 | 1/1984 |

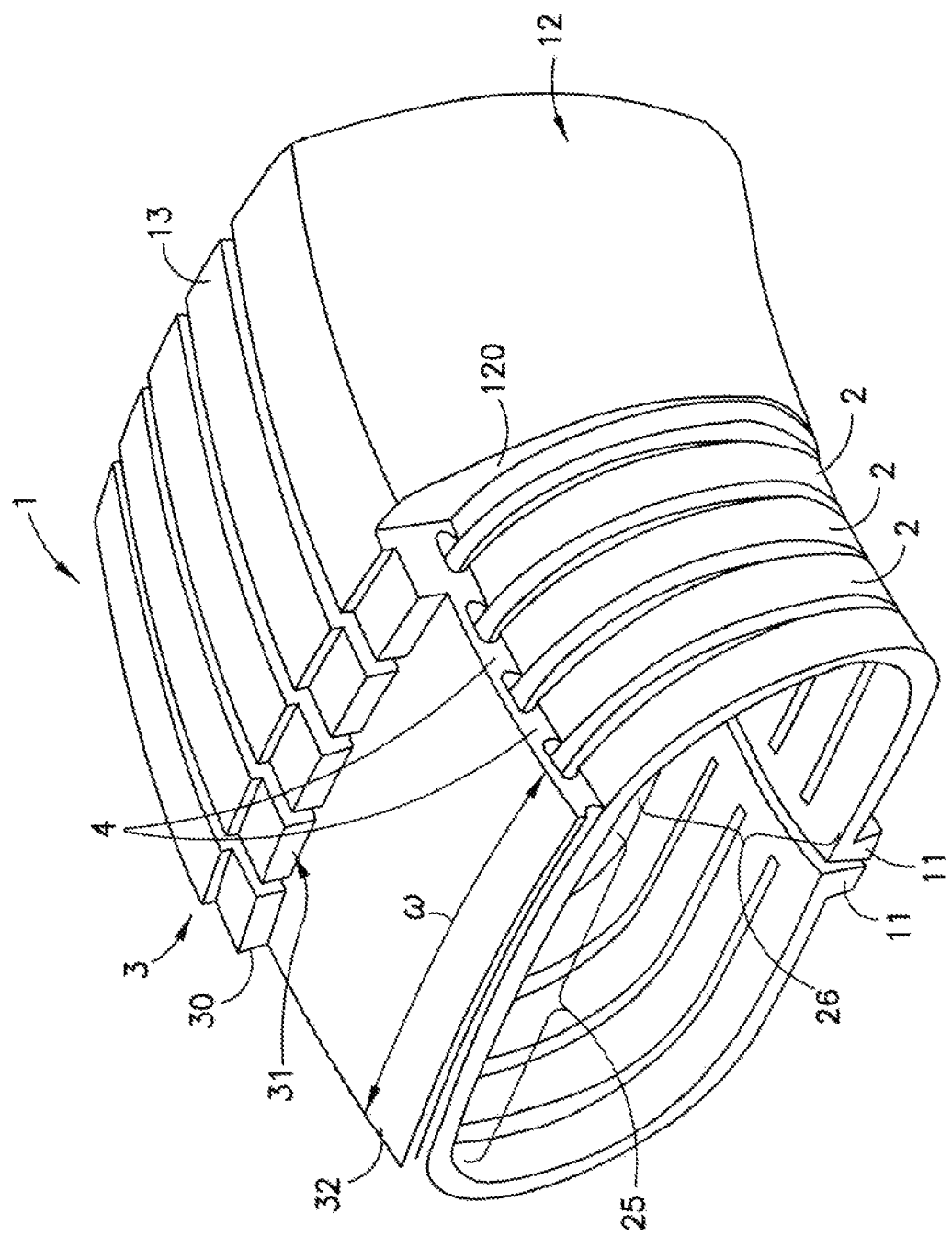

ADHESIVE SYSTEM FOR THE DIRECT BONDING OF A CURED POLYURETHANE TO CRUDE RUBBER

RELATED APPLICATIONS

This patent application is a Divisional of U.S. patent application Ser. No. 11/631,701, filed on Sep. 4, 2007 (now abandoned), which claims the priority of International Application PCT/EP2005/007287, filed on Jul. 6, 2005, which claims priority of French Application No. 0407666, filed Jul. 7, 2004, the disclosure content of each of which is hereby incorporated by reference in its entirety.

FIELD OF THE INVENTION

The present invention relates to adhesive systems usable for bonding polyurethane to rubber in composite materials, more precisely for bonding, cured polyurethane to uncured (unvulcanised) diene elastomers.

The present invention also relates to tires fitted on wheels and designed to be capable of bearing a substantial load without inflation pressure, also referred to as non-pneumatic tires.

BACKGROUND OF THE INVENTION

Patent application WO-A-00/37269 (or U.S. Pat. No. 6,640,589) proposed a resilient non-pneumatic tire characterised by a load-bearing structure essentially comprising a plurality of supporting elements arranged substantially radially in accordance with a cyclic symmetry around the circumference of the tire. When this tire is under load, a certain number of supporting elements present in the contact patch are subjected to major flexure, which enables them to absorb a proportion of the load. An interconnecting structure causes the supporting elements to work together by transferring the stress onto adjacent supporting elements. The load-bearing capacity of this use arises from the flexural stressing of the supporting elements present in the contact patch of the resilient non-pneumatic tire, and it also arises from the flexural stressing of the supporting elements outside the contact patch of the resilient non-pneumatic tire, via this interconnecting structure.

Although the resilient non-pneumatic tire proposed above has proved to be perfectly capable of bearing a major load in normal service, patent application EP-A-1 359 028 (or US-A-2003/0226630) has proposed an improvement to the above load-bearing structure by imparting thereto considerably improved endurance, while maintaining its very considerable load-bearing ability thanks to the introduction of a plurality of resilient articulated joints, each arranged at least in part between the diene elastomer interconnecting structure and the first part of each supporting element.

In this improved flexible tire, as illustrated in FIG. 1 of the above-mentioned application EP-A-1 359 028 and in the single FIGURE of the present application, the supporting elements or arches 2, comprising for example a stack of flexible composite material strips embedded in a rubber matrix, bear the load. They do not work entirely independently of one another, but are connected to one another by an interconnecting structure 3 surmounted by a tread 13, both made from a diene elastomer, with interposed resilient articulated joints 4 so as to ensure effective operation of the assembly, avoiding excessively intense shearing, and so as to provide good uniformity, i.e. relative constancy of properties whatever the circumferential position of the tire relative to the ground.

According to the teaching of said application EP-A-1 359 028, each resilient articulated joint 4 is itself preferably formed of a composition of diene elastomer such as those used for the sidewalls of tires (sufficiently low hysteresis and satisfactory tear strength), which enables the resilient joints to function correctly in their role of transmitting forces between the supporting elements 2 and the interconnecting structure, while withstanding major and repeated deformation. The excellent compatibility which exists between essentially unsaturated diene elastomers ensures in known manner very strong adhesion between the various parts.

Said application EP-A-1 359 028 specifies that another material capable of providing excellent results for this resilient articulated joint 4 is polyurethane.

As is known, polyurethane exhibits very many advantages, including excellent tensile strength, tear strength, resistance to abrasion and to chemicals, and, very particularly, low hysteresis.

One major disadvantage of polyurethane, however, resides in the difficulty of properly bonding this product to a diene elastomer part, as is moreover required by the structure of the non-pneumatic tire described above.

First of all, no effective method is yet known for bonding polyurethane to an uncured, unvulcanised diene elastomer.

While specific liquid polyurethane adhesives capable of bonding cured (i.e. polymerised) polyurethane to cured (vulcanised) diene rubbers are indeed available, this entails independently polymerising the polyurethane, on the one hand, and curing the rubber, on the other, before processing them together for bonding (cf. for example U.S. Pat. No. 4.942, 093).

This solution is not satisfactory, in particular in the present case, due to the great number of drawbacks arising therefrom, some of which are unacceptable from an industrial standpoint and inimical to any attempt to achieve elevated production rates:

it is first of all necessary separately to prepare the above-described tread 13 and the interconnecting structure 3, both made from an uncured diene elastomer, on a rigid core;

an intermediate separate curing step for these diene elastomer parts, before contact with the cured polyurethane, must then be performed;

it must then be possible to apply the liquid polyurethane adhesive uniformly between two cured surfaces at a controlled thickness, while controlling unwanted flow of said adhesive;

without both mechanical and chemical preparation of the surface, such as brushing or scratching of the surfaces to be bonded followed by acid attack, it is impossible to bond the cured polyurethane properly to the cured diene elastomer;

finally, the level of adhesion achieved at high temperature, typically at a temperature of the order of 90° C. to 100° C., is known to be inadequate with regard to the requirements specific to a tire, whether non-pneumatic or pneumatic, for a road vehicle likely to run at sustained high speed.

SUMMARY OF THE INVENTION in the course of its research, the Applicant unexpectedly found a novel adhesive system Which makes it possible directly and effectively to and a cured polyurethane to uncured rubber, so in particular avoiding the intermediate preparative steps on a rigid core followed by separate curing of the upper part of the non-pneumatic tire described above.

Thanks to this specific adhesive system, the radial structure constituted by the arches 2 may perform the function of a rigid core onto which said upper part of the tire (tread 13 and interconnecting structure 3) is applied in the uncured state.

After curing, this solution provides excellent adhesion between the polyurethane and diene rubber, not only at ambient temperature but also, equally unexpectedly and remarkably for the person skilled in the art, at an elevated service temperature.

Consequently, the present invention firstly relates to an adhesive composition, usable in particular as an adhesion primer for bonding a polymerised polyurethane to an uncured diene elastomer composition, characterised in that said adhesive composition comprises at least a polyisocyanate compound and a polyester or vinyl ester resin comprising, functional groups which are reactive towards the isocyanate groups of said polyisocyanate compound, the total number of these isocyanate groups being in excess relative to the total number of said functional groups of the polyester or vinyl ester resin.

The invention also relates to an pre-adherised polyurethane covered with an adhesive composition or adhesion primer according to the invention.

The invention also relates to an adhesive system usable for bonding a cured polyurethane to an uncured diene elastomer composition, comprising in combination such a composition as adhesion primer and a secondary adhesion layer for diene elastomer, which is capable of bonding to the vinyl ester or polyester resin of the adhesion primer.

The invention also relates to the use, for bonding a cured polyurethane to an uncured diene elastomer composition, of such an adhesive composition (or adhesion primer) or of such an adhesive system, both according to the invention.

The invention also relates to a process for adhering a cured polyurethane to an uncured diene elastomer composition, comprising at least the following steps:
- applying the above-defined adhesive composition, as adhesion primer, onto the prepolymerised polyurethane;
- polymerising the adhesion primer and the polyurethane so covered with its primer;
- then applying onto the thus pre-adherised polyurethane the above-stated secondary adhesion layer;
- bringing the uncured diene elastomer composition into contact with the polyurethane thus adherised;
- curing the assembly.

The invention also relates to a composite per se, both before and after curing, comprising at least a first polyurethane part integral with a second diene rubber part by means of an adhesive interphase, characterised in that said adhesive interphase is based on at least a polyisocyanate compound, a polyester or vinyl ester resin comprising functional groups which are reactive towards isocyanate groups of said polyurethane, and a secondary adhesion layer for diene elastomer capable of bonding to the vinyl ester or polyester resin of the adhesion primer.

The invention also relates to the use of said composite for the manufacture of a rubber article, and to any rubber article comprising such a composite.

The invention relates in particular to the use of such a composite for the manufacture or reinforcement of any ground contact system for motor vehicles, such as a non-pneumatic tire, a pneumatic tire, an internal safety support for tires, wheel, rubber spring, elastomer articulated joint, other suspension and anti-vibration element, or alternatively semi-finished rubber and polyurethane products intended for such ground contact systems.

The invention also relates to ground contact systems and the stated semi-finished rubber and polyurethane products when they comprise a composite according to the invention.

The invention very particularly relates to a pneumatic or non-pneumatic tire, such a tire being capable of being fitted to any type of motor vehicle, for example to a passenger vehicle, two-wheeled vehicle (in particular motorcycles), aircraft, such as industrial vehicles selected, from among vans, "heavy goods vehicles",—i.e. subway trains, buses, road transport machinery (lorries, tractors, trailers), off-road vehicles such as agricultural machinery or construction machinery-, other transport or handling vehicles.

BRIEF DESCRIPTION OF THE DRAWINGS

The only drawing shows a partial perspective view of a non-pneumatic tire according to an embodiment of the invention, with a cutaway revealing its internal elements,

DETAILED DESCRIPTION OF THE INVENTION

In order to adhere in particular a cured polyurethane to an uncured (unvulcanised) diene elastomer composition, the present invention proposes a novel adhesive system making use of a specific primer adhesive and a secondary adhesive layer, both of which arc described in detail hereafter.

The process according to the invention and the application of such a process to the manufacture of composite parts, in particular composite parts used in the construction of non-pneumatic flexible tires are then described.

In the present description, unless expressly stated otherwise, all stated percentages (%) are weight percentages, I-1. Adhesion Primer The adhesive composition according to the invention is essentially based on a polyisocyanate compound and a vinyl ester or unsaturated polyester resin, said resin comprising functional groups which are reactive towards the isocyanate groups of the polyisocyanate compound. An essential feature of this adhesive composition, in order for it to be able to react with the surface of polyurethane, is that the total number of isocyanate groups of the polyisocyanate compound is in (stoichiometric) excess relative to the total number of said functional groups of said resin.

A) Polyisocyanate Compound:

Any kind of polyisocyanate compound mar be used, but the compound is preferably selected within the group consisting of diisocyanates, triisocyanates and mixtures of such compounds.

More preferably, diisocyanates are used, for example paraphenylene diisocyanate (PPDI), tolidine diisocyanate (TODI), isophorone diisocyanate (IPDI), 4,4'-methylenebis (phenyl isocyanate) (MDI), toluene diisocyanate (TDI), naphthalene 1,5-diisocyanate (NDI) and equivalent products.

This polyisocyanate compound is more preferably selected within the group consisting of diphenylmethane diisocyanate (MDI), toluene diisocyanate (TDI) and mixtures of these compounds. TDI, which is liquid at ambient temperature and of suitable reactivity, is particularly preferred.

B) Polyester or Vinyl Ester Resin of the Primer:

The polyester ("polyester resin") is taken in known manner to mean an unsaturated polyester resin) or vinyl ester type resin has the essential feature of comprising functional groups which are reactive towards the isocyanate groups of the polyisocyanate, compound.

Preferred examples of such reactive functional groups which may be mentioned are those selected within the group consisting of hydroxyl (—OH) groups, carboxyl (—COOH) groups, thiol (—SH) groups, (primary or secondary) amine groups —NH, —NH$_2$ and —NHR, amide groups —CONH$_2$ and —CONHR, thioamide groups —CSNH$_2$ and —CSNHR, sulfonic groups —SO$_2$OH, and mixtures of such functional groups, the substituent radical R here representing any monovalent hydrocarbon radical (having for example from 1 to 18 carbon atoms). More preferably, these reactive functional groups are hydroxyl groups.

Without this definition being limitative, the resin used is preferably a vinyl ester resin of the epoxy type, also referred to as an "epoxy vinyl ester". Epoxy vinyl ester resins are well known to the person skilled in the art, having been described in numerous publications, in particular in patent documents EP-A-1 074 369, U.S. Pat. No. 6,329,475 or WO-A-84/00170.

An epoxy vinyl ester resin which is more preferably used is one which is at least in part novolac- and/or bisphenol-based (i.e. is grafted onto a novolac also known as phenoplast) and/or bisphenol type structure), i.e., a novolac-based, bisphenol-based or novolac- and bisphenol-based resin.

A novolac-based epoxy vinyl ester resin (portion between square brackets in formula I below) satisfies, for example, in known manner the formula (n typically less than 10, for example from 1 to 5):

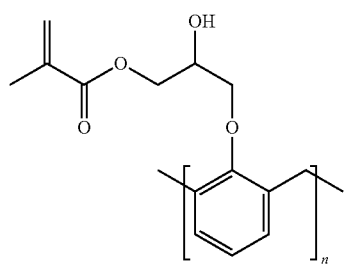

(I)

A bisphenol A-based epoxy vinyl ester resin (the portion between square brackets of formula II below) satisfies, for example, the formula (the "A" indicating that the product is produced with the assistance of acetone) (n typically less than 10, for example from 1 to 5):

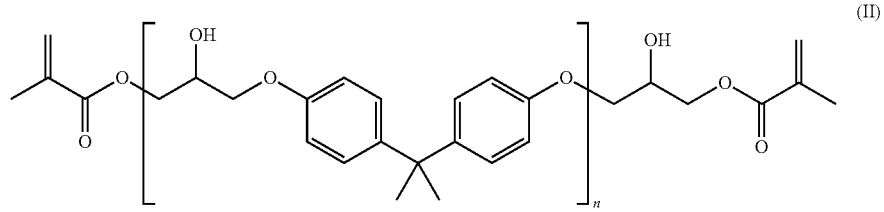

(II)

It will be noted that the —OH groups of these resins (arising in known manner from opening of the starting epoxy functions) are capable of reacting with the isocyanate groups (—NCO) of the polyisocyanate compound to form urethane bonds.

A novolac and bisphenol type epoxy vinyl ester resin has, in particular, exhibited excellent results, for example the vinyl ester resin "ATLAC 590" from DSM (diluted with approximately 40% stirene); such epoxy vinyl ester resins are available from other manufacturers such as Dow, Reichhold, Cray Valley, UCB.

The adhesive composition or adhesion primer according to the invention may advantageously comprise a certain number of additives intended to improve its properties in use.

Thus, in order to adjust the latter's viscosity to the specific conditions of performance of the invention, the possible solvent content of the polyester or vinyl ester resin may he adjusted, or alternatively a photoinitiator may be used. It is preferred to use a solvent for the resin in a preferred content of between 5 and 15% (% by weight of the total of resin and its associated solvent).

It is also advantageously possible to use a flexibilising agent, also referred to as a "chain extender", which is intended to make the composition more flexible once polymerised, in particular to bring about an appreciable increase in its elongation at break. A low molecular weight diene elastomer, for example a polybutadiene, is preferably used, more preferably functionalised at the chain ends with vinyl ester or polyester, such an elastomer having, a weight average molecular weight (stated as Mw) more preferably of between 2000 and 4000 g/mol. The weight ratio of chain extender to resin when dry is preferably between 0 and 1.5, more preferably between 0.8 and 1.4.

In this adhesive composition, the weight ratio of polyisocyanate compound to resin in the dry state is preferably between 0.5 and 2.0, more preferably between 1.0 and 1.8, such a ratio being calculated on a molar basis of TDI polyisocyanate (molar mass equal to approximately 174 g; 2 —NCO groups per mole).

In other words, the weight ratio of polyisocyanate compound to resin when dry is preferably of between 0.5(M/174)(2/N) and 2.0(M/174)(2/N), more preferably between 1.0(M/174)(21N) and 1.8(M/174)(2/N), M being the molar mass and N the number of —NCO groups (or equivalents) per mole of the polyisocyanate compound. This simply means that in the case of another polyisocyanate which had, for example, a molar mass twice that of TDI, said weight ratio would then preferably be between 1.0 and 4.0, more preferably between 2.0 and 3.6.

More generally and preferably, and this has in particular proved to be the case for the preferred weight ratios stated above, the primer formulation comprises an appreciable excess, or at least twice as many —NCO isocyanate groups as functional groups (in particular hydroxyl —OH) of the polyester or vinyl ester resin.

This appreciable excess ensures that the primer has a very marked capability of adhering to the cured polyurethane. For this reason, the (number) ratio of —NCO to functional groups of the resin, more particularly —NCO to —OH groups, is more preferably greater than 3, for example typically between 3 and 8.

The adhesion primer is prepared by mixing the previously described polyisocyanate compound and resin together with the other possible additives until a homogeneous composition is obtained. A period of a few seconds to a few minutes is generally sufficient. The pot life of the adhesion primer is preferably fairly short, for example from a few minutes to a few tens of minutes when kept in the open air at 20° C. or several hours at lower temperature and with low ambient humidity.

I-2.—Secondary Adhesion layer

The uncured diene elastomer composition may be adhered to the polyurethane which has been coated with the adhesion primer and then cured (known as "pre-adherised" polyurethane), using any secondary adhesion layer (or hereafter "secondary layer") for dime elastomer which by definition is capable of bonding, for example by chemical reaction or by means of a crosslinking agent, on the one hand to the diene elastomer and on the other hand to the vinyl ester or polyester resin of the adhesion primer.

The person skilled in the art will know, depending on the particular intended application, how to select such a secondary layer which is compatible with the primer, for example from among known phenolic resin-based general purpose adhesives such as RFL glues (preferably finely sprayed onto the adhesion primer), the "Chemosil" range of polymeric secondary adhesives (e.g. "Chemosil 231G", "Chemosil 411", "Chemosil 425", etc.) in particular distributed by the company Henkel, which are capable of bonding diene elastomers onto miscellaneous substrates such as in particular thermosetting reinforced epoxy or polyester plastics, rigid polyurethanes.

According to one particularly preferred embodiment, a specific secondary adhesion layer, hereafter also referred to as "diene glue", is used which has the characteristic of comprising, on the one hand, a diene elastomer and, on the other hand, an additional compound capable of bonding, for example by chemical reaction or by means of a crosslinking agent, to the vinyl ester or polyester resin of the adhesion primer.

This additional compound preferably consists of a polyester or vinyl ester resin. In such a preferred case, although the polyester or vinyl ester resin of the glue, unlike the primer, does not require the presence of functional groups which are reactive towards isocyanate groups, this resin is itself advantageously and preferably an epoxy vinyl ester resin, in particular a novolac- and/or bisphenol-based epoxy vinyl ester resin as preferably used in the adhesion primer.

In the above diene glue, the diene elastomer is preferably a polyvinylpyridine/stirene/butadiene elastomer (abbreviated to "p-VSBR").

The p-VSBR elastomer consists in known manner of a polyvinylpyridine coupled to an SBR diene elastomer (stirene/butadiene rubber) of the general formula:

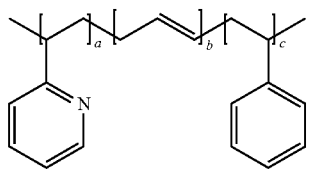

(III)

This is a polymer having, a very high molecular mass, preferably of 500,000 to 1,000,000 g/mol. It is generally commercially available in the form of a latex (emulsion in a dilute basic aqueous phase), for example with a content approaching 40% by weight of polymer.

The person skilled in the art will know how to adjust the formulation of the secondary layer in the light of the following description and examples of embodiment, depending on the specific intended applications.

To ensure optimum effectiveness, it is preferred that the amount of p-VSBR is between 10% and 40% and that of the resin is between 40% and 80% (% by weight of glue in the "dry" state, i.e. without either solvent, apart from the solvent for the resin itself, or water). More preferably, the amount of p-VSBR is between 15% and 30% (for example between 15% and 25%) and the amount of resin is between 50% and 75% (for example between 60% and is 75%).

This diene glue, which is sulfur-crosslinkable thanks to the presence of the diene elastomer, in particular p-VSBR, is capable of ensuring direct bonding of the pre-adherised polyurethane to an uncured diene elastomer composition.

The above-described diene glue may have a relatively high viscosity, which may complicate industrial processing thereof. This is why its viscosity is preferably reduced by adding a solvent for the resin, more pieferably stirene, in an amount preferably of between 0% and 40% (% by weight of the final, i.e. ready-to-use, adhesive). More preferably, the amount of solvent is adjusted between 5% and 35%, in order to impart sufficient flow to the glue; below 5%, this flow may prove inadequate depending on the intended industrial application; beyond 35% or 40%, there is a risk of excessively high flow (risk of occurrence of unwanted draining phenomena).

A solvent content more preferably of between 10% and 30%, still more preferably of between 10% and 20%, will be used to ensure optimum application of the diene glue on performance of the above-described process of the invention.

Unlike adhesive compositions known to the person skilled in the art based on diene elastomer, for example p-VSBR, the diene glue does not require the presence of water, for which reason it may be described as "non-aqueous" although it can withstand a small quantity of water without damage, the latter preferably being present in an amount less than 5%, more preferably of less than 2% (% by weight of the finished, ready-to-use adhesive).

In order to obtain curing times compatible with those of rubber, the above secondary layer may advantageously comprise known, polymerisation accelerators and activators for the resin itself, such as cobalt(II) salts (for example cobalt 2-ethythexanoate), dimethylaniline (DMA) or diethylaniline (DEA), N,N-dimethylacetoacetamide (DMAA) or N,N-diethylacetoacetamide (DEAA), typically in contents of between 0.3 and 3.0 phr (parts by weight per hundred parts of elastomer).

The secondary layer may also comprise all or some of the additives usually used in adhesive compositions intended for bonding diene rubbers, such as reinforcing fillers such as carbon black or silica, anti-ageing agents, for example antioxidants, plasticisers, coupling agents, a crosslinking system based either on sulfur, or on sulfur donors and/or peroxide, accelerators, vulcanisation activators or retarders, methylene acceptors and donors (such as HMT or H3M), reinforcing resins such as resorcinol, bismaleimide, tackifying resins.

The crosslinking (vulcanisation) system proper is preferably based on sulfur and a primary vulcanisation accelerator, in particular an accelerator of the sulfonamide type. Various secondary accelerators or known vulcanisation activators such as zinc oxide, stearic acid, etc. are, if necessary, added to this basic vulcanisation system. Sulfur is used in a preferred amount of between 0.5 and 10 phr, more preferably of between 0.5 and 5.0 phr. The primary vulcanisation accelerator is used in a preferred amount of between 0.5 and 10 phr, more preferably of between 0.5 and 5.0 phr.

The above-described diene glue may be prepared starting, for example, from a diene elastomer latex, in particular p-VSBR, by extracting the water from the latex and then incorporating the resin dissolved in stirene into the elastomer.

The step of extracting water from the latex may be performed by any means known to the person skilled in the art, in particular by the action of a coagulant such as a salt, a base or an acid, for example by coagulation in an acetone-water mixture in an acidic medium (e.g.: HCl) then neutralisation (with water or by the action of a weak base), followed by a filtrate recovery and drying step (evaporation of the solvent).

The water may also be extracted from the latex by azeotropic distillation, in which case the elastomer is dissolved in an organic solvent such as toluene and an additional step may be added in order to perform at least partial final extraction of the organic solvent(s) used.

It is preferably during the step of incorporating the elastomer into the resin that all the additives to the diene glue, in particular its crosslinking system, are added. These additives are preferably themselves present in solution or as a suspension (which is the case, for example, for carbon black and ZnO, which are insoluble) in an appropriate organic liquid, preferably the same as that used, if applicable, for the azeotropic distillation step.

In the above-described diene adhesive, the weight ratio of resin:diene elastomer, in particular resin:p-VSBR is preferably selected between 1 and 8. More preferably, it is between 1.5 and 7.0, for example between 2.0 and 6.0. A value within a range from 3 to 5 (for example approaching or equal to 4) has proved optimal in a large number of cases.

I-3.—Process of the Invention

The process according to the invention for adhering a cured (polymerised) polyurethane to an uncured diene elastomer composition, comprises the following, steps:

applying the above-defined adhesion primer onto the solid polyurethane;

polymerising the adhesion primer and the polyurethane thus covered with its adhesion primer;

then applying onto the thus preadherised polyurethane the above-defined secondary adhesion layer;

bringing the uncured diene elastomer composition into contact with the polyurethane thus adherised;

curing the assembly, preferably under pressure.

For the purposes of performing the process of the invention, the polyurethane must be in at least partially polymerised (i.e. "prepolymerised") state, i.e. sufficiently solid to receive the adhesion primer, and is moreover essentially of the shape which it will have in the finished composite (apart from any possible subsequent cutting out operations).

The polyurethane may be available as such in the solid or prepolymerised state, or alternatively be prepared just prior to performance of the first step of the above process, in a manner familiar to the person skilled in the art from a liquid urethane prepolymer, of the castable or injection mouldable type, and a curing compound ("curing agent"), for example a polyol or a polyamino compound. The duration of this prepolymerisation step may vary depending, on the particular conditions applied, typically from a few minutes to a few hours (for example between 30 min and 3 h) at a temperature preferably of between 80° C. and 120° C. (for example approximately 110° C.), it being understood that using a polymerisation catalyst (for example a tertiary amine or $C_{18}$ fatty acid) may make it possible to reduce the duration of such a step to only a few minutes.

Examples of such urethane prepolymers which may be mentioned are the products Adiprene® (L series) and Vibrathane® from Crompton, Baytee® from Bayer.

Urethane prepolymer curing agents are well known. Examples of polyols which may be mentioned are dials, such as for example ethylene glycol, diethylene glycol, triethylene glycol, 1,3-butanediol, 1,4-butanediol, or triols such as for example glycerol amino compounds which may be mentioned are, for example, diphenylmethane compounds such as le 3,3'-dichloro-4,4'-diaminodiphenylmethane (abbreviated to "MOCA"), 2,2'-dichloro-3,3',5,5'-tetraethyl-4,4'-diaminodiphenylmethane (abbreviated to "MCDEA"), toluenedimines such as 3,5-dimethylthio-2,4-toluenediamine, 3,5-diethyl-2,4-toluenediamine, benzoates such as trimethylene glycol di-p-aminobenzoate, polytetramethylene glycol di-p-aminobenzoate.

Of course, other additives such as colorants, fillers, dispersants, antioxidants or other stabilisers, could be added at the same time as the curing agent.

Accordingly, during a first step, the adhesion primer is applied onto the at least prepolymerised polyurethane, by any known means such as spraying, immersion in a bath, or by application with a brush or spatula.

This adhesion primer application step may advantageously be preceded by a prior preparatory step of activating the surface of the polyurethane, in particular by mechanical action (for example brushing) or even chemical action, always providing that this activation, in particular when it is of a chemical nature, does not disrupt the effectiveness of the adhesive system of the invention. Such surface preparation may promote mechanical keying of the adhesion primer and in particular prevent excessively rapid evaporation of the polyisocyanate compound on the surface of the polyurethane.

The following step of polymerising the adhesion primer and the polyurethane covered in this manner with its primer is preferably performed by heat treatment within a temperature range more preferably of between 90° C. and 120° C. (for example between 100° C. and 115° C.) so as not to degrade the mechanical properties of the product. More preferably still, this curing is carried out under pressure, for example in an autoclave under a pressure of between 4 and 8 bar, in order to avoid possible bubbling of the polyisocyanate which, if liquid (as TDI is), may have a tendency to evaporate.

It is thought that it is during this polymerisation step, which is typically of a duration of between 10 and 20 h, that, on the one hand, the final reaction proceeds within the adhesion primer between the functional reactive groups of the polyester or vinyl ester resin and the isocyanate groups, and chemical linkage is effected between the functional groups present on the surface of the polyurethane and the (excess) free isocyanate groups of the primer, and, on the other hand, the polyurethane undergoes post-curing or complete polymerisation, enabling it to achieve its nominal, in particular mechanical, properties.

The primer thus applied and cured on the pre-adherised polyurethane is very stable over time and could be stored, preferably protected from contamination such as dust, before use of the secondary adhesion layer. It is, however, generally preferred to perform the following step immediately afterwards.

The above-described secondary adhesion layer is then applied onto the polyurethane which has been cured and pre-adherised in this manner, by any means known (for example brush, spatula, spraying), then this combination is covered with the uncured diene elastomer composition.

The final step then involves curing the assembly, preferably under pressure, in order to permit crosslinking of the secondary layer and adhesion primer, together with complete vulcanisation of the rubber.

I-4.—Composite of the Invention

The invention applies to any kind of composite capable of being obtained by the above-described process, the composite comprising at least a first polyurethane part integral with a second diene rubber composition part by means of an adhesive interphase, said adhesive interphase being based:
- on the one hand, on the polyisocyanate compound and the polyester or vinyl ester resin comprising functions which are reactive towards the isocyanate groups of said polyisocyanate compound, polyisocyanate and resin originating from the adhesion primer;
- on the other hand, on the secondary adhesion layer for the diene elastomer capable of bonding to the vinyl ester or polyester resin of adhesion primer.

Said secondary adhesion layer is preferably an adhesive based on a diene elastomer and an additional compound capable of bonding to the vinyl ester or polyester resin of the adhesion primer. More preferably, said diene elastomer is a polyvinylpyridine/stirene/butadiene (abbreviated to "p-VSBR").

In the composite of the invention, the secondary adhesion layer compound capable of bonding to the vinyl ester or polyester resin of the primer preferably itself consists itself of a vinyl ester or polyester resin. Using an identical resin in the primer and the secondary layer, in particular an epoxy vinyl ester type resin, is in particular advantageous, since the adhesive interphase of the composite is in this case simply based on the three essential constituents, namely the polyisocyanate compound, the polyester or vinyl ester resin comprising functional groups which are reactive towards the isocyanate groups of said polyisocyanate, and finally the diene elastomer, in particular p-VSBR.

In this composite according to the invention, the thickness of the adhesive interphase, after curing, is preferably between 0.02 and 0.50 mm, more preferably between 0.02 and 0.10 mm.

The phrase adhesive interphase "based on" should, of course, here be taken to mean an interphase comprising the mixture and/or in situ reaction product of the various base constituents used for this interphase, some of which, in particular the primer and secondary adhesion layer, being intended, at least in part to react with one another or with their dose chemical environment, during the various phases of manufacture of the composites or finished articles comprising such composites, in particular during the final curing step.

"Diene" elastomer (or similarly robber) is understood to mean, in known manner, an elastomer arising at least in part (i.e. a homopolymer or a copolymer) from diene monomers, i.e. monomers bearing two double carbon-carbon bonds, whether conjugated or not. The diene elastomer used is preferably selected within the group consisting of polybutadienes (BR), natural rubber (NR), synthetic polyisoprenes (IR), butadiene/stirene copolymers (SBR), isoprene/butadiene copolymers (BIR), isoprene/stirene copolymers (SIR), butadiene/stirene/isoprene copolymers (SBIR) and mixtures of these elastomers.

A preferred embodiment involves using an "isoprene" elastomer, i.e. an isoprene homopolymer or copolymer, in other words a diene elastomer selected within the group consisting of natural rubber (NR), synthetic polyisoprenes (IR), the various copolymers of isoprene and mixtures of these elastomers.

The isoprene elastomer is preferably natural rubber or a synthetic polyisoprene of the cis-1,4 type. Of these synthetic polyisoprenes, those polyisoprenes having a content (Mol %) of cis-1,4 bonds of greater than 90%, more preferably still greater than 98%, are preferably used. According to other preferred embodiments, the diene elastomer may be made up, entirely or in part, of another diene elastomer such as, for example, an SBR elastomer used in a blend or not with another elastomer, for example of the BR type.

Said rubber composition may also comprise all or some of the additives usually used in the rubber matrices intended for the manufacture of tires, such as for example reinforcing fillers such as carbon black or inorganic fillers such as silica, coupling agents for inorganic tillers, anti-ageing agents, anti-oxidants, plasticising agents or extender oils, the latter being of either aromatic or non-aromatic nature (in particular very slightly aromatic or non-aromatic oils, for example of the naphthenic or paraffinic type, of high or preferably low viscosity, MES or TDAE oils, plasticising resins with a high Tg greater than 30° C.), agents which facilitate handling (processability) of the uncured compositions, tackifying resins, a crosslinking system based on sulfur, sulfur donors and/or peroxide, accelerators, vulcanisation activators or retarders, antireversion agents, methylene acceptors and donors, such as for example HMT (hexamethylenetetramine) or H3M (hexamethoxymethylmelamine), reinforcing resins (such as resorcinol or bismaleimide), known adhesion promoter systems, for example of the metal salt type, in particular cobalt or nickel salts.

I-5.—Application to the Manufacture of Pneumatic or Non-Pneumatic Tires

The invention also relates to any tire, whether of the pneumatic or non-pneumatic type, for a road vehicle in which there cooperate or are associated at least one diene elastomer structural part with at least one polyurethane structural part.

The invention applies in particular to a pneumatic (i.e. conventional) tire, at least one part of the structure of which, bead zone, sidewall or crown of the tire, comprises a polyurethane element in particular of high modulus in extension, in contact with another diene elastomer element.

The invention also applies in particular to a non-pneumatic tire as described, for example, in the above-mentioned patent application EP-A-1 359 028, which has a flexible load-bearing structure extending circumferentially around an axis of rotation, a tread on the radially outer periphery of the load-bearing structure, and at least one fastening zone, radially on the side of the axis of rotation, for immobilising said load-bearing structure to a wheel disc, the load-bearing structure comprising (with reference to the appended figure):
- a plurality of supporting elements 2 extending essentially transversely, a first part of which is arranged opposite at least a part of the tread 13, and another part of which is arranged beyond the tread, said supporting elements 2 being juxtaposed circumferentially and distributed all around the circumference;
- a diene elastomer interconnecting structure 3, providing circumferential interconnection between the supporting elements 2;
- a plurality of elastic polyurethane articulated joints 4, each arranged at least in part between the interconnecting structure 3 and the first part of each supporting element;
- said diene elastomer interconnecting structure 3 being connected to the elastic polyurethane articulated joints 4 by means of an adhesive interphase based on the above-described polyisocyanate compound, the polyester or vinyl ester resin and p-VSBR elastomer.

The appended figure illustrates one particular advantageous embodiment of such a tire in which the profile of the tire delimits a toric internal cavity of ovoid cross-section. The tire 1 comprises two axially separable fastening zones 11, two sidewalls 12 and a tread 13. The tread 13 comprises several parallel ribs, but this aspect is, of course, not of a limitative nature. The sidewalls 12 are rounded and occupy the major part de the radial height of the tire 1. The load-bearing structure comprises supporting elements 2, which are also referred to as radial arches. These supporting elements 2 are circumferentially adjacent and each one extends substantially radially from one fastening zone 11 to the other.

By way of example, the arches 2 may comprise a stack of superposed flexible composite material strips with an interposed layer of diene elastomer or polyurethane between said strips. The bundle of strips bonded to one another in this manner forms a beam capable of being flexurally stressed. This aspect of the structure of the laminate is, however, not limitative. Reference may be made to the above-mentioned application EP-A-1 359 028 and to FIG. 2 thereof for further details.

The load-bearing structure also comprises an interconnecting structure 3 between the supporting elements 2, preferably arranged radially between the tread 13 and the supporting elements 2. The interconnecting structure 3 is capable of distributing radial stress circumferentially between several supporting elements 2, while still permitting, differences in displacement between adjacent supporting elements. To this end, the interconnecting structure 3 preferably comprises substantially circumferentially oriented reinforcement, for example a monofilament reinforcement 30 embedded in an elastomeric matrix 31, wound at several points to encircle the assembly of supporting elements 2 opposite the tread 13, itself preferably being of diene rubber.

In this specific case, the turns of monofilament reinforcement 30 are arranged radially over a layer 32 of an elastomeric material. The monofilament reinforcement 30 is wound substantially circumferentially, i.e. at an angle of close to 0.degree. relative to a plane perpendicular to the axis. Said monofilament reinforcement 30 may be wound in accordance with the desired number of turns or, equivalently, a desired number of monofilament rings may be provided. It should be noted that, as a variant on monofilament reinforcement 30, numerous cables, including those which are commonly used as reinforcement arranged at zero degrees within the tread of conventional tires, could be used. A reinforcement taking the form of a strip or tape, for example of reinforced composite material, could also be used instead of a monofilament reinforcement. Here too, the strip or tape is wound in accordance with desired number of turns or used in the form of a desired number of rings.

The reader may usefully refer to the above-mentioned patent application WO 00137269 for further details relating to the constitution of these supporting elements and the interconnecting structure.

It can be seen on the figure that the supporting elements 2 and the interconnecting structure 3 are connected to one another by elastic articulated joints 4. Each supporting element 2 is surmounted radially by such a elastic articulated joint 4, which provides a mechanical connection between the supporting elements 2 and the interconnecting structure 3, the forces transmitted from one to the other passing through said elastic articulated joints 4. In a preferred embodiment of the invention, said supporting elements 2 are axially continuous opposite the tread and beyond, out to the fastening zones 11. It can be seen that each supporting element 2 comprises a median part 25 substantially corresponding to the width of the interconnecting structure 3. In the non-limitative example illustrating the invention, this is the manner in which said first part (of each supporting element) arranged opposite at least part of the tread is produced. The interconnecting structure 3 occupies substantially the entire width (w) of the tread 13. Each elastic articulated joint 4 makes it possible to connect the median part 25 of the supporting elements 2 to the interconnecting structure 3. It may also be seen that each supporting element 2 comprises, on either side of the tire, a lateral part 26 extending into the sidewall 12 and meeting the fastening zone 11. In the non-limitative example illustrating the invention, this is the manner in which said other part (of each supporting element) arranged beyond the tread, where the supporting dements are flexed when the tire is loaded, is produced.

In one possible variant embodiment, as has already been described, in the above-mentioned application EP-A-1 359 028, the tire 1 may or may not comprise an external skin 120 imparting thereto a uniform appearance as can be seen in the right-hand part of the figure; this skin 120, which is not designed to transmit forces, whether between supporting elements or between supporting elements and the interconnecting structure, simply covers the assembly of the supporting elements 2, on the outside of the latter. There could also be a material between the supporting elements 2, partially or completely filling the space between two adjacent supporting elements 2.

In the pneumatic tire 1 of the invention, all or some of the elastic articulated joints 4, preferably each of them, is/are of polyurethane and the connection between the polyurethane and the diene rubber of the interconnecting structure 3 is provided thanks to the adhesive system according to the invention.

II. Examples of the Embodiments

II-1. Preparation of the Adhesive System.

The adhesion primer is prepared by mixing, until a homogeneous composition is obtained (duration: a few minutes), approximately 70 g of TDI with approximately 50 g of a novolac- and/or bisphenol-based epoxy vinyl ester resin ("ATLAC 590") comprising approximately 10% by weight of residual stirene as solvent for the resin (% by total weight of resin and stirene).

The weight ratio of TDI to resin, when dry is thus of the order of 1.55. The ratio of —NCO:—OH functional groups is here greater than 3 (indeed close to 5, depending on the estimated degree of polymerisation of the specific epoxy vinyl ester resin used here); in other words, the adhesion primer contains approximately five times more isocyanate groups than hydroxyl groups.

Approximately 50 g of polybutadiene which is functionalised at its chain ends with vinyl ester is added to the adhesion primer as chain extender (product "Hycar X-168" from Noveon; Mw equal to approximately 3000 g/mol), according to a weight ratio of chain extender to resin when dry which is thus approximately equal to 1.1.

The secondary adhesion layer or diene glue is prepared starting from, for example, a p-VSBR elastomer latex, from which the water is extracted by coagulation, then a vinyl ester resin in solution in stirene is incorporated into said elastomer in a weight ratio (resin:elastomer) approximately equal to 4.

More precisely, 210 ml of acetone and 415 ml of 1% HCl (pH equal to approximately 1 to 2) are mixed in a reactor. A mixture of 35 ml of water and 50 g of p-VSBR latex ("Pyratex 240" from PolymerLatex) taking the form of an emulsion of polymer in water (40% polymer, specifically 20 g of p-VSBR, with 60% water and basic stabilising agents at pH 10-12) is added dropwise with stirring and at ambient temperature (over a period of approximately 45 min) under a stream of nitrogen. Simultaneously, in order to hold the pH at a constant value of 1-2, 40 ml of (10% strength) HCl are added dropwise. The latex accordingly coagulates finely and regularly during the addition. The mixture is then left to stand until the phases have completely separated, the elastomer floating on the surface. The polymer is then separated from the aqueous phase, after which it is washed several times with water to adjust the pH slowly back towards 7. A final wash may be performed, for example, with a water/acetone mixture. Once the mixture has been left to settle, the polymer may be treated with an apparatus capable of atomising the polymer into very fine particles. Finally, the mixture is filtered and the polymer is dried for 12 hours, under vacuum, at a temperature of 60° C.

The 20 g of p-VSBR obtained in this manner are added to 125 g of epoxy vinyl ester resin ("ATLAC 590", 80 g of dry vinyl ester and 45 g of stirene) and the mixture is left to stand overnight. The polymer swells, absorbing the resin.

The remainder of the components are added (carbon black, vulcanisation agents, etc.) in accordance with the detailed formulation shown in the appended Table 1 (the quantities in phr are it by weight per 100 parts of p-VSBR elastomer), directly in an external mixer (open mill), at ambient temperature, and mixing is performed until as homogeneous, black-coloured glue is obtained. The diene glue thus prepared advantageously contains lees that 1% of water (% by weight of the finished, ready-to-use composition).

In order not only to increase the viscosity of the diene glue but also to reduce the quantity of solvent released during subsequent press curing of the composite, the vinyl resin ester may be dried under a high vacuum before being mixed with the elastomer, for example down to a residual stirene content of between 10% and 15%. It should again be emphasised that, although this diene glue comprises a certain residual quantity of solvent, it does not have the usual drawbacks of solvent-containing glues because the stirene reacts completely during use of the diene glue by participating in the polymerisation of the latter; it thus does not need to be evaporated.

II-2. Preparation of Composites—Characterisation

A rubber/polyurethane composite according to the invention is prepared by performing the process of the invention in accordance with the above-described steps, more specifically using the procedure stated below.

The starting urethane prepolymer used is the product Adiprene® LF930A from Crompton, consisting of a polyether-terminated TDI prepolymer. The latter is cast in a mould of predetermined shape (determined by the shape of the intended composite) in the presence of its curing agent (MCDEA), and subjected to 45 minutes prepolymerisation at a temperature of 110° C. in order to solidify it in this pre-defined shape (in this case a simple strip of polyurethane which, once cut out, has a width of 25 mm, a length of at least 150 mm and a thickness of approximately 2 mm).

After mechanical brushing, the adhesion primer is applied by brush onto the layer of polyurethane prepolymerised in this manner, in a layer thickness of approximately 50 to 100 μm.

The polyurethane and the adhesion primer covering it are then polymerised by curing for 24 hours at 110° C. in an autoclave under a pressure of 6 bar.

The secondary adhesion layer is then applied by spatula in a layer thickness of approximately 0.5 mm onto the polyurethane thus cured and pre-adherised.

The whole is covered with a layer of uncured diene rubber composition (strip of identical dimensions to the first polyurethane layer), the formulation of which corresponds to a known rubber composition based on natural rubber and carbon black, which may in particular be used as calendering rubber for a reinforcement armature of a conventional pneumatic tire carcass; two different formulations (stated in phr) are given by way of example in Table 2.

The assembly is finally press cured, for example at 165° C. for 55 min, under a pressure of 20 bar, enabling completion of the polymerisation of the secondary adhesion layer onto the primer and onto the rubber, together with vulcanisation or curing of the rubber.

These curing parameters are only indicative and may be modified for example curing at 165° C. for 15 to 30 mm under a pressure of 20 bar) in particular thanks to the use of variable quantities of polymerisation accelerators or activators in the resin of the secondary adhesion layer.

The resultant composite is then subjected to a known peeling test as described in international standard ISO 8510-1: 1990(F), which involves tearing apart the respective two polyurethane and diene rubber parts, the test being performed at ambient temperature (23° C.) and at elevated temperature (90'C).

Very high tearing forces are then observed in the composite according to the invention prepared in this manner, not only when cold (forces of as high as 1000 to 1200 N for a width of 25 mm) but also when hot at 90-100° C. (a load of greater than 700 N for this same width of 25 mm), which is all the more unexpected and immediately demonstrates the excellent performance of the adhesive system according to the invention to the person skilled in the art.

The loss of tearing forces between 23° C. and 90-100° C. is only approximately 35% here, whereas it is for example greater than 80% in the above-mentioned document U.S. Pat. No. 4,942,093 which describes the use of a liquid, polyurethane adhesive which is itself already improved relative to conventional commercial adhesives for bonding polyurethane and uncured rubber.

In both cases, on peeling, the composite of the invention fails not in the adhesive interphase, but in the layer of elastomer, which illustrates a very high level of adhesion both when cold and when hot.

The same operation performed without adhesion primer reveals that the polyurethane and the rubber do not bond together, whether at low or high temperature.

Other examples of embodiment, carried out with different secondary adhesion layers (RFL glue sprayed onto the adhesion primer; "Chemosil 411" adhesive from Henkel brushed onto the adhesion primer) have rise to the same excellent results.

In conclusion, a novel, particularly effective adhesive system has been found which makes it possible to bond a cured polyurethane directly to uncured rubber, while in particular avoiding all the above-stated prior drawbacks of bonding cured polyurethane to rubber which is itself cured, in particular the use of liquid, polyurethane adhesives which exhibit inadequate performance in terms of adhesion when hot.

While the adhesive composition according to the invention is particularly suitable, as an adhesion primer, for bonding a cured polyurethane onto uncured rubber, its range of potential industrial applications is wide and may extend to products, in particular polymers or elastomers, other than polyurethane, provided that these products comprise functionalities likely to react with such an adhesive composition.

TABLE 1

| | |
|---|---|
| Carbon black (N683) | 50 |
| Tackifying resin | 1 |

TABLE 1-continued

| | |
|---|---|
| Formophenolic resin | 10 |
| HMT | 3.3 |
| Polymerisation accelerator (1) | 2 |
| Polymerisation activator (2) | 0.5 |
| ZnO | 3 |
| stearic acid | 1 |
| sulfur | 2.2 |
| Vulcanisation accelerator (3) | 0.9 |

(1) cobalt(II) 2-ethylhexanoate (Akzo Nobel accelerator "NL-51P");
(2) N,N-diethylacetoacetamide (Akzo, Nobel "Promoter C");
(3) N-dicyclohexyl-2-benzothiazole sulfenamide ("Santocure CBS" from Flexsys).

TABLE 2

| | | |
|---|---|---|
| Natural rubber | 100 | 55 |
| SBR elastomer | — | 15 |
| BR elastomer | — | 30 |
| Carbon black (N326) | 66 | 50 |
| Antioxidant (1) | 2.2 | 1.5 |
| Extender oil | 2 | 10 |
| ZnO | 7.5 | 5.0 |
| stearic acid | 0.6 | 0.6 |
| sulfur | 4.5 | 3.0 |
| Vulcanisation accelerator (2) | 0.7 | 0.9 |

(1) N-(1,3-dimethylbutyl)-N'-phenyl-p-phenylenediamine; ("Santoflex 6-PPD" from Flexsys);
(2) N-dicyclohexyl-2-benzothiazole sulfenamide ("Santocure CBS" from Flexsys).

The invention claimed is:

1. A process for adhering a cured polyurethane to an uncured diene elastomer composition, characterised in that it comprises the following steps:
    applying an adhesive composition, as adhesion primer, onto the prepolymerised polyurethane, wherein said adhesive composition comprises a polyisocyanate compound and a polyester or vinyl ester resin comprising functional groups which are reactive towards the isocyanate groups of said polyisocyanate compound, the total number of these isocyanate groups being in excess relative to the total number of said functional groups of the polyester or vinyl ester resin;
    polymerising together the adhesion primer and the polyurethane thus covered with its primer;
    then applying onto the thus pre-adherised polyurethane the secondary adhesion layer for diene elastomer capable of bonding to the vinyl ester or polyester resin of the adhesion primer;
    bringing the uncured diene elastomer composition into contact with the polyurethane thus adherised; and
    curing the assembly.

2. A process according to claim 1, the secondary adhesion layer being based on a diene elastomer and an additional compound capable of bonding to the vinyl ester or polyester resin of the adhesion primer.

3. A process according to claim 2, the diene elastomer of the secondary adhesion layer being a polyvinylpyridine/stirene/butadiene elastomer (abbreviated to "p-VSBR").

4. A process according to claim 2, the additional compound of the secondary adhesion layer capable of bonding to the vinyl ester or polyester resin of the adhesion primer being a vinyl ester or polyester resin, preferably a vinyl ester resin.

5. A process according to claim 4, the resin of the secondary adhesion layer being an epoxy vinyl ester resin, preferably a novolac- and/or bisphenol-based epoxy vinyl ester resin.

6. A process according to claim 1, the step of applying the adhesion primer being preceded by a prior step of mechanical and/or chemical activation of the surface of the polyurethane.

7. A process according to claim 1, the polymerisation step of the adhesion primer on the polyurethane being performed at a temperature of between 90° C. and 120° C.

8. A process according to claim 7, the duration of the adhesion primer polymerisation step being between 10 and 20 hours.

9. A process according to claim 3, the amount of p-VSBR in the secondary adhesion layer being between 10% and 40% (% by weight of secondary adhesion layer when dry).

10. A process according to claim 4, the amount of resin in the secondary adhesion layer being between 40% and 80% (% by weight of secondary adhesion layer when dry).

11. A process according to claim 4, the secondary adhesion layer furthermore comprising, as solvent for the resin, between 0% and 40% of stirene (% by weight of the ready-to-use secondary adhesion layer).

12. A process according to claim 1, the secondary adhesion layer furthermore comprising a polymerisation accelerator and polymerisation activator.

13. A process according to claim 1, the secondary adhesion layer furthermore comprising a crosslinking system.

14. A process according to claim 1, the secondary adhesion layer furthermore comprising a reinforcing filler.

15. A process according to claim 1, wherein said step of curing the assembly is performed under pressure.

16. A process according to claim 7, the polymerisation step of the adhesion primer on the polyurethane being performed under pressure.

17. A process according to claim 1, the secondary adhesion layer furthermore comprising a crosslinking system based on sulfur and sulfenamide accelerator.

18. A process according to claim 1, the secondary adhesion layer furthermore comprising a reinforcing filler selected within the group consisting of carbon black and silica.

* * * * *